United States Patent
Suzuki et al.

(10) Patent No.: US 10,762,875 B2
(45) Date of Patent: Sep. 1, 2020

(54) SYNCHRONIZATION OF A DISPLAY DEVICE IN A SYSTEM INCLUDING MULTIPLE DISPLAY DEVICES

(71) Applicant: Intel Corporation, Santa Clara, CA (US)

(72) Inventors: Nobuyuki Suzuki, Portland, OR (US); Zhiming Zhuang, Sammamish, WA (US); Arvind S. Tomar, Folsom, CA (US); Nausheen Ansari, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/944,592

(22) Filed: Apr. 3, 2018

(65) Prior Publication Data

US 2019/0043446 A1    Feb. 7, 2019

(51) Int. Cl.

| | |
|---|---|
| *G06F 3/038* | (2013.01) |
| *G09G 5/00* | (2006.01) |
| *G09G 5/12* | (2006.01) |
| *G06F 3/14* | (2006.01) |
| *G09G 5/18* | (2006.01) |
| *G06F 3/044* | (2006.01) |
| *G06F 3/041* | (2006.01) |

(52) U.S. Cl.
CPC .............. *G09G 5/12* (2013.01); *G06F 3/044* (2013.01); *G06F 3/0412* (2013.01); *G06F 3/1431* (2013.01); *G06F 3/1446* (2013.01); *G09G 5/18* (2013.01)

(58) Field of Classification Search
None
See application file for complete search history.

(56) References Cited

U.S. PATENT DOCUMENTS

| | | | |
|---|---|---|---|
| 2007/0159412 A1* | 7/2007 | Dai | G06F 3/1438 345/1.1 |
| 2007/0195101 A1* | 8/2007 | Senior | G09G 5/39 345/545 |
| 2014/0062974 A1* | 3/2014 | Panvelwala | G06F 3/1446 345/204 |
| 2015/0370371 A1 | 12/2015 | Azumi et al. | |
| 2016/0239249 A1* | 8/2016 | Lee | G06F 3/1446 |
| 2017/0263204 A1* | 9/2017 | Tanaka | G09G 3/3677 |

FOREIGN PATENT DOCUMENTS

JP      2008051848 A    3/2008

* cited by examiner

*Primary Examiner* — Lunyi Lao
*Assistant Examiner* — Kirk W Hermann
(74) *Attorney, Agent, or Firm* — Schwabe, Williamson & Wyatt, P.C.

(57) ABSTRACT

Embodiments include apparatuses, methods, and systems including a selector. A selection signal may be provided to the selector to select a first synchronization signal as a control signal when the first synchronization signal is available, otherwise a second first synchronization signal as the control signal. The first or the second synchronization signal may synchronize a first or second display content received by a first or second display device with a first or a second display refresh rate, respectively. The control signal may be provided to a controller to control the second display content received by the second display device. Other embodiments may also be described and claimed.

25 Claims, 6 Drawing Sheets

SYNCHRONIZATION OF A DISPLAY DEVICE IN A SYSTEM INCLUDING MULTIPLE DISPLAY DEVICES

FIELD

Embodiments of the present invention relate generally to the technical field of communication and computing, and more particularly to a system including multiple display devices.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

There may be advantages, e.g., increased productivity or improved user experiences, to use multiple display devices for a computing system, e.g., a converged mobility system, which may allow the multiple display devices to function as one screen. A display content received by a display device may be synchronized with a display refresh rate of the display device. When multiple display devices may be available in a computing device, a display device may perform different functions at different situations, e.g., as a display device at one time, or as an input device at another time, to provide more flexibility to the computing device. Synchronization problems may arise for one display device when another display device may perform different functions.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
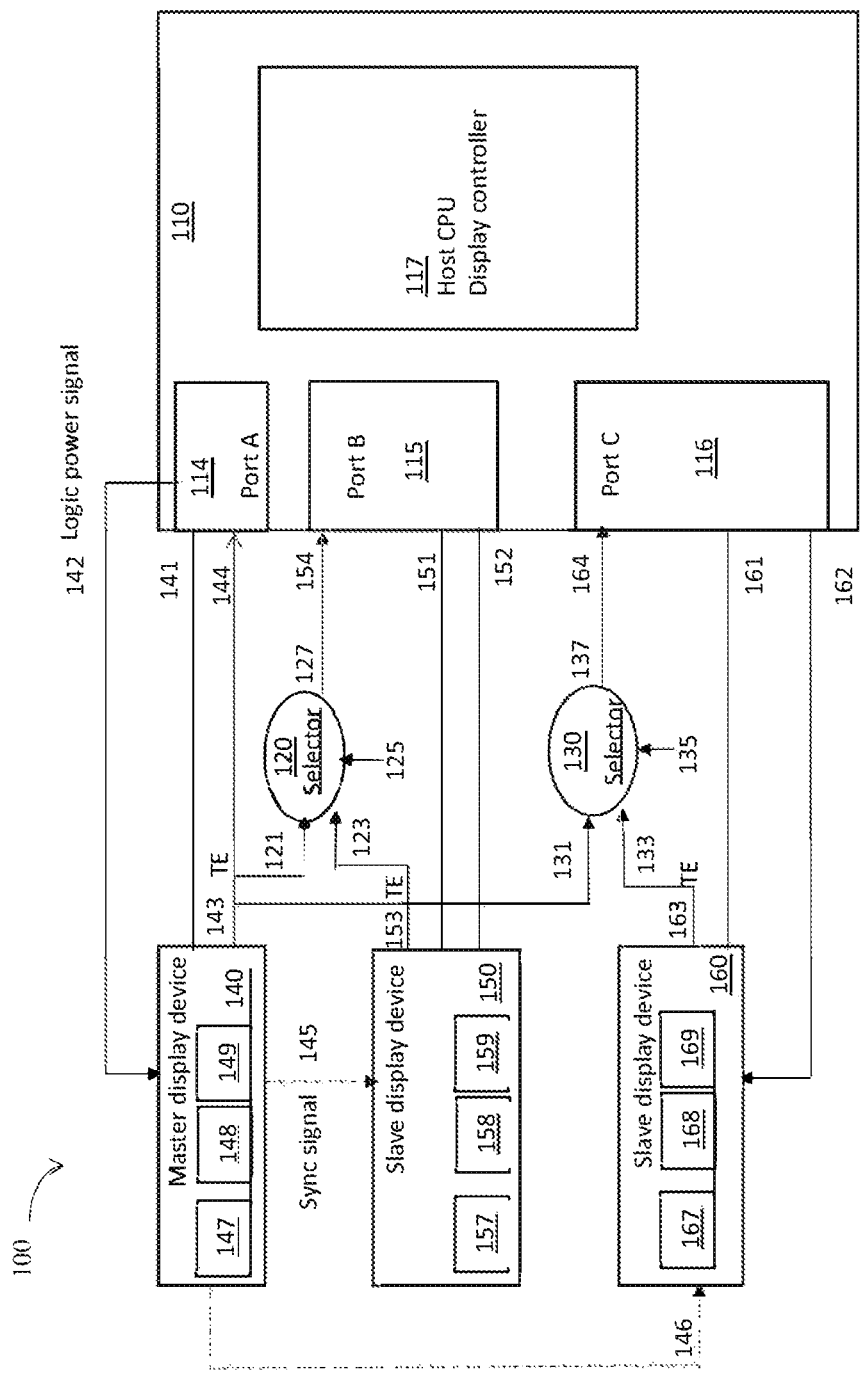
FIG. 1 illustrates an example computing device including multiple display devices, where a control signal to a controller to control a display content received by a second display device may be determined based on the availability of a synchronization signal for a first display device, in accordance with various embodiments.

A computing device may include multiple display devices to increase productivity or to improve user experiences. When two or more display devices are active, one display device may become a master display device to all the other display devices, while another display device may become a slave display device to the master display device. The master display device may be a timing source and the slave display device may be a timing sink, so that both display devices may synchronize their display refresh rate to have corresponding display contents viewed concurrently using both display devices. As such, a second display content received by the second display device may be synchronized by the first display device when the first display device may act as a master display device. However, to provide more flexibility to the computing device, the first display device may perform different functions at different situations, e.g., as a display device at one time, or as an input device at another time. Hence, when the first display device may not function as a display device, the second display content received by the second display device may be synchronized by a synchronization signal from the second display device when the first synchronization signal is not available.

In embodiments, an apparatus for computing may include a selector. A first link, a second link, a third link, and a fourth link may be coupled to the selector. The first link may receive a first synchronization signal from a first display device of the apparatus or a computing device hosting the apparatus. The second link may receive a second synchronization signal from a second display device of the apparatus or the computing device. The first synchronization signal may synchronize a first display content received by the first display device with a first display refresh rate of the first display device, while the second synchronization signal may synchronize a second display content received by the second display device with a second display refresh rate of the second display device. The third link may provide a control signal to a controller of the apparatus or the computing device to control the second display content received by the second display device. The fourth link may provide the selector with a selection signal to select the first synchronization signal as the control signal to be provided to the controller when the first synchronization signal is available, otherwise to select the second synchronization signal as the control signal to be provided to the controller.

In embodiments, an apparatus for computing may include a communication interface and a controller coupled to the communication interface. The communication interface may receive a control signal, where the control signal may be a first synchronization signal from a first display device of the apparatus or a computing device hosting the apparatus when the first synchronization signal is available, otherwise a second synchronization signal from a second display device of the apparatus or the computing device. The first synchronization signal may synchronize a first display content received by the first display device with a first display refresh rate of the first display device, and the second synchronization signal may synchronize a second display content received by the second display device with a second display refresh rate of the second display device. The controller may determine to transmit the second display content to the second display device based on the control signal.

In embodiments, a method performed by a computing device may include receiving a control signal, wherein the control signal is equal to a first synchronization signal from a first display device when the first synchronization signal is available, otherwise a second synchronization signal from a second display device. The first synchronization signal may synchronize a first display content received by the first display device with a first display refresh rate of the first display device, and the second synchronization signal may synchronize a second display content received by the second display device with a second display refresh rate of the second display device. The method may further include transmitting the second display content to the second display device based on the control signal.

In the description to follow, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A or B" and "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used hereinafter, including the claims, the term "module" or "routine" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

The terms "coupled with" and "coupled to" and the like may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. By way of example and not limitation, "coupled" may mean two or more elements or devices are coupled by electrical connections on a printed circuit board such as a motherboard, for example. By way of example and not limitation, "coupled" may mean two or more elements/devices cooperate and/or interact through one or more network linkages such as wired and/or wireless networks. By way of example and not limitation, a computing apparatus may include two or more computing devices "coupled" on a motherboard or by one or more network linkages.

As used herein, the term "circuitry" refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD), (for example, a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality.

As used herein, the term "processor circuitry" may refer to, is part of, or includes circuitry capable of sequentially and automatically carrying out a sequence of arithmetic or logical operations; recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes.

As used herein, the term "interface circuitry" may refer to, is part of, or includes circuitry providing for the exchange of information between two or more components or devices. The term "interface circuitry" may refer to one or more hardware interfaces (for example, buses, input/output (I/O) interfaces, peripheral component interfaces, network interface cards, and/or the like).

As used herein, the term "computer device" may describe any physical hardware device capable of sequentially and automatically carrying out a sequence of arithmetic or logical operations, equipped to record/store data on a machine readable medium, and transmit and receive data from one or more other devices in a communications network. A computer device may be considered synonymous to, and may hereafter be occasionally referred to, as a computer, computing platform, computing device, etc. The term "computer system" may include any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources. Examples of "computer devices", "computer systems", etc. may include cellular phones or smart phones, feature phones, tablet personal computers, wearable computing devices, an autonomous sensors, laptop computers, desktop personal computers, video game consoles, digital media players, handheld messaging devices, personal data assistants, an electronic book readers, augmented reality devices, server computer devices (e.g., stand-alone, rack-mounted, blade, etc.), cloud computing services/systems, network elements, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management Systems (EEMSs), electronic/engine control units (ECUs), vehicle-embedded computer devices (VECDs), autonomous or semi-autonomous driving vehicle (hereinafter, simply ADV) systems, in-vehicle navigation systems, electronic/engine control modules (ECMs), embedded systems, microcontrollers, control modules, engine management systems (EMS), networked or "smart" appliances, machine-type communications (MTC) devices, machine-to-machine (M2M), Internet of Things (IoT) devices, and/or any other like electronic devices. Moreover, the term "vehicle-embedded computer device" may refer to any computer device and/or computer system physically mounted on, built in, or otherwise embedded in a vehicle.

As used herein, the term "network element" may be considered synonymous to and/or referred to as a networked computer, networking hardware, network equipment, router, switch, hub, bridge, radio network controller, radio access network device, gateway, server, and/or any other like device. The term "network element" may describe a physical computing device of a wired or wireless communication network and be configured to host a virtual machine. Furthermore, the term "network element" may describe equipment that provides radio baseband functions for data and/or voice connectivity between a network and one or more users. The term "network element" may be considered synonymous to and/or referred to as a "base station." As used herein, the term "base station" may be considered synonymous to and/or referred to as a node B, an enhanced or evolved node B (eNB), next generation nodeB (gNB), base transceiver station (BTS), access point (AP), roadside unit (RSU), etc., and may describe equipment that provides the radio baseband functions for data and/or voice connectivity between a network and one or more users. As used herein, the terms "vehicle-to-vehicle" and "V2V" may refer to any communication involving a vehicle as a source or destination of a message. Additionally, the terms "vehicle-to-vehicle" and "V2V" as used herein may also encompass or be equivalent to vehicle-to-infrastructure (V21) communications, vehicle-to-network (V2N) communications, vehicle-to-pedestrian (V2P) communications, or V2X communications As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for the purpose of transmitting and receiving information.

FIG. 1 illustrates an example computing device 100 including multiple display devices, e.g., a display device 140, a display device 150, and a display device 160, where a control signal 154 to a controller 117 to control a display content 157 received by the display device 150 may be determined based on the availability of a synchronization signal 143 for the display device 140, in accordance with various embodiments. For clarity, features of the computing device 100, the display device 140, the display device 150, the display device 160, the control signal 154, the controller 117, the display content 157, and the synchronization signal 143, may be described below as an example for understanding a computing device, multiple display devices, a control signal, a controller, a display content, and a synchronization signal. It is to be understood that there may be more or fewer components included in the computing device 100, the display device 140, the display device 150, the display device 160, the control signal 154, the controller 117, the display content 157, and the synchronization signal 143. Further, it is to be understood that one or more of the devices and components within the computing device 100, the display device 140, the display device 150, the display device 160, the control signal 154, the controller 117, the display content 157, and the synchronization signal 143 may include additional and/or varying features from the description below, and may include any devices and components that one having ordinary skill in the art would consider and/or refer to as a computing device, multiple display devices, a control signal, a controller, a display content, and a synchronization signal.

Figure 2:
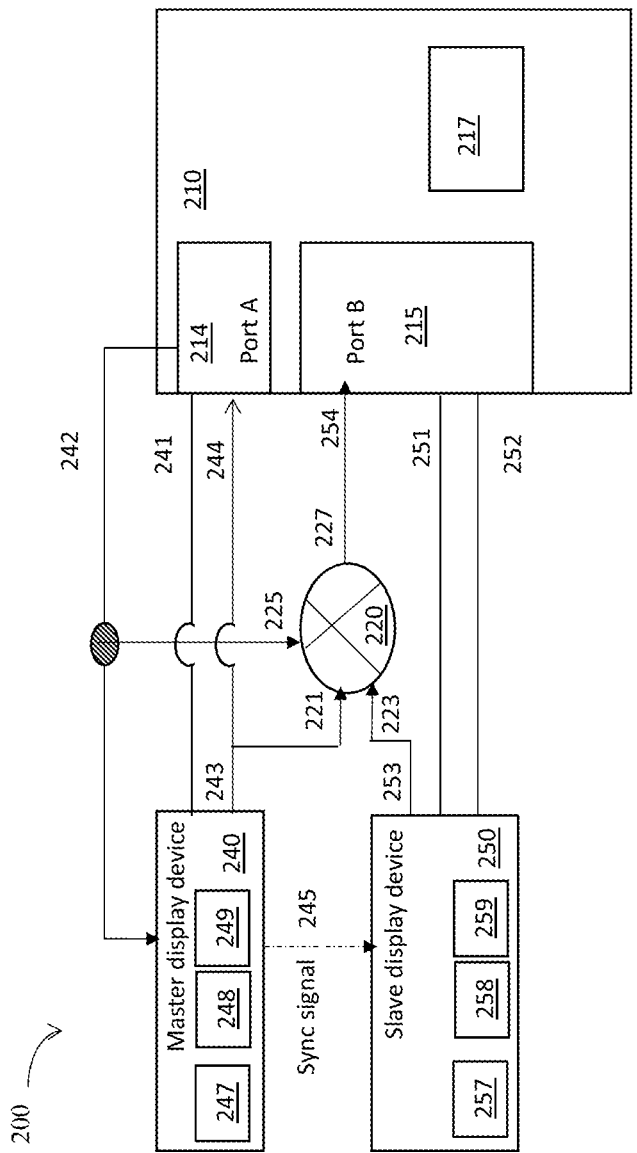
FIG. 2 illustrates an example computing device including two display devices, where a control signal to a controller to control a display content received by a second display device may be determined based on the availability of a synchronization signal for a first display device, in accordance with various embodiments.
Figure 3:
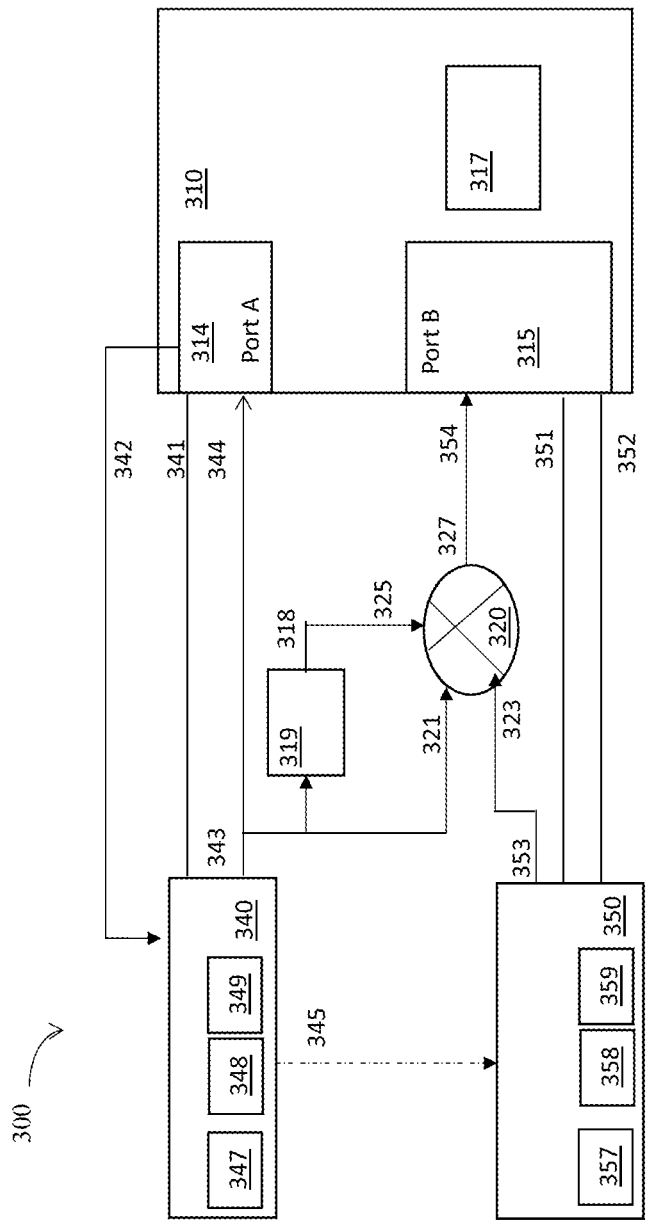
FIG. 3 illustrates another example computing device including two display devices, where a control signal to a controller to control a display content received by a second display device may be determined based on the availability of a synchronization signal for a first display device, in accordance with various embodiments.

In embodiments, the computing device 100 may include multiple display devices, e.g., the display device 140, the display device 150, the display device 160, and an apparatus 110 that has the controller 117. The three display devices, e.g., the display device 140, the display device 150, the display device 160, may be provided as examples only, and are not limiting. In some embodiments, there may be only two display devices, e.g., the display device 140 and the display device 150, or as shown in FIG. 2 and FIG. 3. In some other embodiments, there may be more than three display devices. The display device 140 may be a master display device of the computing device 100, while the display device 150 or the display device 160 may be a slave display device of the computing device 100. A display device, e.g., the display device 140, may function as a display device at one time, and may function as an input device to the computing device 100 at another time.

In embodiments, the computing device 100 may further include a selector 120 to provide the control signal 154 to the controller 117 to control the display content 157 received by the display device 150, and a selector 130 to provide a control signal 164 to the controller 117 to control a display content 167 received by the display device 160.

In embodiments, the display device 140 may display a display content 147, with a display refresh rate 148, on a display 149. The display content 147 may be received over a channel 141 coupled to the apparatus 110. In addition, the display device 140 may receive a logic power signal 142 from the apparatus 110 to determine a power supply to the display device 140, and may provide the synchronization signal 143 to synchronize the display content 147 received by the display device 140 with the display refresh rate 148. The synchronization signal 143 may be a tearing effect removal timing signal for the display device 140. The synchronization signal 143 may be available when the display device 140 may function as a display device, and may not be available when the display device 140 may not function as a display device, e.g., as an input device, or being turned off without power. Furthermore, the display device 140 may provide a synchronization signal 145 to the display device 150 to synchronize the display content 157, and provide a synchronization signal 146 to the display device 160 to synchronize the display content 167, when the synchronization signal 143 is available, and the display device 140 may act as a master display device.

In embodiments, the display device 150 may display the display content 157, with a display refresh rate 158, on a display 159. The display content 157 may be received over a channel 151 coupled to the apparatus 110. In addition, the display device 150 may receive a logic power signal 152 from the apparatus 110 to determine a power supply to the display device 150, and may provide a synchronization signal 153 to synchronize the display content 157 received by the display device 150 with the display refresh rate 158. The synchronization signal 153 may be a tearing effect removal timing signal for the display device 150. The display content 157 received by the display device 150 may be synchronized by the synchronization signal 153 from the display device 150 when the synchronization signal 143 may not be available, or synchronized by the display device 140, e.g., by the synchronization signal 145, when the synchronization signal 143 may be available. The synchronization signal 143 may be available when the display device 140 may function as a display device, and may not be available when the display device 140 may not function as a display device, e.g., as an input device.

In embodiments, the display device 160 may display the display content 167, with a display refresh rate 168, and/or a display 169. The display content 167 may be received over a channel 161 coupled to the apparatus 110. In addition, the display device 160 may receive a logic power signal 162 from the apparatus 110 to determine a power supply to the display device 160, and may provide a synchronization signal 163 to synchronize the display content 167 received by the display device 160 with the display refresh rate 168. The synchronization signal 163 may be a tearing effect removal timing signal for the display device 160. The display content 167 received by the display device 160 may be synchronized by the synchronization signal 163 from the display device 160 when the synchronization signal 143 may not be available from the display device 140, or synchronized by the display device 140, e.g., by the synchronization signal 146, when the synchronization signal 143 may be available. The synchronization signal 143 may be available when the display device 140 may function as a display device, and may not be available when the display device 140 may not function as a display device, e.g., as an input device.

The apparatus 110 may include a communication interface 114 to be coupled to the display device 140, a communication interface 115 to be coupled to the display device 150, a communication interface 116 to be coupled to the display device 160, and the controller 117 coupled to the communication interface 114, the communication interface 115, and the communication interface 116. The communication interface 114, the communication interface 115, and the communication interface 116 may perform same or similar functions for different display devices.

In more detail, the communication interface 114 may include the channel 141 to couple the display device 140 to transmit the display content 147, the logic power signal 142 to determine a power supply to the display device 140, and to receive a control signal 144, which may be coupled to the synchronization signal 143 from the display device 140. The control signal 144 may be used to synchronize the display content 147 received by the display device 140 with the display refresh rate 148 of the display device 140.

In embodiments, the communication interface 115 may include the channel 151 to couple the display device 150 to transmit the display content 157, the logic power signal 152 to determine a power supply to the display device 150, and to receive the control signal 154, which may be determined by the selector 120. The control signal 154 may be used to synchronize the display content 157 received by the display device 150 with the display refresh rate 158 of the display device 150. The control signal 154 may be equal to the synchronization signal 143 when the synchronization signal 143 is available, otherwise equal to the synchronization signal 153. The controller 117 may determine to transmit the display content 157 to the display device 150 based on the control signal 154. The controller 117 may determine to transmit the display content 147 to the display device 140 based on the control signal 154 when the synchronization signal 143 is available.

In embodiments, the communication interface 116 may include the channel 161 to couple the display device 160 to transmit the display content 167, the logic power signal 162 to determine a power supply to the display device 160, and to receive the control signal 164, which may be determined by the selector 130. The control signal 164 may be used to synchronize the display content 167 received by the display device 160 with the display refresh rate 168 of the display device 160. The control signal 164 may be equal to the synchronization signal 143 when the synchronization signal 143 is available, otherwise equal to the synchronization signal 163. The controller 117 may determine to transmit the display content 167 to the display device 160 based on the control signal 164.

In embodiments, there may be a first link 121, a second link 123, a third link 127, and a fourth link 125 coupled to the selector 120. The first link 121 may couple the selector 120 to receive the synchronization signal 143 from the display device 140. The second link 123 may couple the selector 120 to receive the synchronization signal 153 from the display device 150. The third link 127 may couple the selector 120 to the apparatus 110 to provide the control signal 154 to the controller 117 of the apparatus 110. The fourth link 125 may be coupled to the selector 120 to provide the selector 120 with a selection signal to select the control signal 154. When the synchronization signal 143 may be available, the selection signal on the fourth link 125 of the selector 120 may select the synchronization signal 143 to be the control signal 154, otherwise, the selection signal on the fourth link 125 of the selector 120 may select the synchronization signal 153 to be the control signal 154.

In embodiments, there may be a first link 131, a second link 133, a third link 137, and a fourth link 135 coupled to the selector 130. The first link 131 may couple the selector 130 to receive the synchronization signal 143 from the display device 140. The second link 133 may couple the selector 130 to receive the synchronization signal 163 from the display device 160. The third link 137 may couple the selector 130 to the apparatus 110 to provide the control signal 164 to the controller 117 of the apparatus 110. The fourth link 135 may be coupled to the selector 130 to provide the selector 130 with a selection signal to select one of the signals on first link 131 and the second link 133, and output the control signal 164. When the synchronization signal 143 is available, the selection signal on the fourth link 135 of the selector 130 may select the synchronization signal 143 to be the control signal 164, otherwise, the selection signal on the fourth link 135 of the selector 130 may select the synchronization signal 163 to be the control signal 164.

In embodiments, a link, e.g., the link 121, the link 123, the link 125, the link 127, the link 131, the link 133, the link 135, or the link 137, may be an actual physical link. The link may be a wired cable, or a wireless link. For example, the link 121 may be a wired cable, while the link 123 may be a wireless link. Different links may use a same or different communication technology. For example, the link 121 may use a wireless cellular technology, the link 123 may use a different wireless technology, such as Bluetooth®, while the link 125 may be a wired cable.

In embodiments, the display refresh rate 148, the display refresh rate 158, or the display refresh rate 168 may be provided in a frame by frame basis. The display refresh rate 148, the display refresh rate 158, or the display refresh rate 168 may be 60 Hz, 120 hz, or 240 hz. The display 149, the display 159, or the display 169 may be a selected one of a light-emitting diode (LED) display, a cathode ray tubes (CRT) display, a liquid crystal display (LCD), a thin film transistor liquid crystal display (TFT-LCD), a digital light processing (DLP) display, a plasma display, an electroluminescent panel, an organic light-emitting diode (OLED) display, or an electronic paper. The display content 147, the display content 157, or display content 167, may be received by the display device 140, the display device 150, the display device 160, respectively, according to a protocol selected from a mobile industry processor interface display serial interface (MIPI-DSI) protocol, a high-definition multimedia interface (HDMI) protocol, a display port (DP) protocol, a Miracast protocol, or a wireless display (WiDi) protocol. In addition, the computing device 100 may be a tablet, a mobile device, a smart phone, a smart television (TV), a wearable device, a touchscreen display, or a head-mounted display (HMD), a laptop, a game controller, a set-top box, an infotainment console, an Internet of Things (IoT) device, or others.

FIG. 2 illustrates an example computing device 200 including two display devices, e.g., a display device 240 and a display device 250, where a control signal 254 to a controller 217 to control a display content 257 received by the display device 250 may be determined based on the availability of a synchronization signal 243 for the display device 240, in accordance with various embodiments. The computing device 200, the display device 240, the display device 250, the control signal 254, the controller 217, the display content 257, and the synchronization signal 243 may be examples of the computing device 100, the display device 140, the display device 150, the display device 160, the control signal 154, the controller 117, the display content 157, and the synchronization signal 143, respectively, as shown in FIG. 1.

In embodiments, the computing device 200 may include the display device 240 and the display device 250, an apparatus 210 that has the controller 217, and a selector 220 to provide the control signal 254 to the controller 217 to control the display content 257 received by the display device 250.

In embodiments, the display device 240 may display a display content 247, with a display refresh rate 248, on a display 249. The display content 247 may be received over a channel 241 coupled to the apparatus 210. In addition, the display device 240 may receive a logic power signal 242 from the apparatus 210 to determine a power supply to the display device 240, and may provide the synchronization signal 243 to synchronize the display content 247 received by the display device 240 with the display refresh rate 248. The synchronization signal 243 may be a tearing effect removal timing signal for the display device 240. Furthermore, the display device 240 may provide a synchronization signal 245 to the display device 250 to synchronize the display content 257, when the synchronization signal 243 is available.

In embodiments, the display device 250 may display the display content 257, with a display refresh rate 258, on a display 259. The display content 257 may be received over a channel 251 coupled to the apparatus 210. In addition, the display device 250 may receive a logic power signal 252 from the apparatus 210 to determine a power supply to the display device 250, and may provide a synchronization signal 253 to synchronize the display content 257 received by the display device 250 with the display refresh rate 258. The synchronization signal 253 may be a tearing effect removal timing signal for the display device 250. The display content 257 received by the display device 250 may be synchronized by the synchronization signal 253 from the display device 250 when the synchronization signal 243 may not be available, or synchronized by the display device 240, e.g., by the synchronization signal 245, when the synchronization signal 243 may be available.

In embodiments, the apparatus 210 may include a communication interface 214 to couple to the display device 240, a communication interface 215 to couple to the display device 250, and the controller 217 coupled to the communication interface 214 and the communication interface 215. In more detail, the communication interface 114 may receive a control signal 244, which may be coupled to the synchronization signal 243 from the display device 240. The control signal 244 may be used to synchronize the display content 247 received by the display device 240 with the display refresh rate 248 of the display device 240.

In embodiments, the communication interface 215 may include the channel 251 to couple the display device 250 to transmit the display content 257, the logic power signal 252 to determine a power supply to the display device 250, and to receive the control signal 254, which may be determined by the selector 220.

In embodiments, the selector 220 may be a multiplexer, or any other circuits that may select one output from two inputs. There may be a first link 221, a second link 223, a third link 227, and a fourth link 225 coupled to the selector 220. The first link 221 may couple the selector 220 to receive the synchronization signal 243 from the display device 240. The second link 223 may couple the selector 220 to receive the synchronization signal 253 from the display device 250. The third link 227 may couple the selector 220 to the apparatus 210 to provide the control signal 254 to the controller 217 of the apparatus 210. The fourth link 225 may be coupled to the selector 220 to provide the selector 220 with a selection signal to select the control signal 254.

In embodiments, the selection signal provided on the fourth link 225 may be the logic power signal 242 to the display device 240 to determine a power supply to the display device 240. When the logic power signal 242 may be low, which may mean that there is no power supply to the display device 240, the selector 220 may select the synchronization signal 253 on the second link 223 to be outputted as the control signal 254. On the other hand, when the logic power signal 242 may be high, which may mean that there is power supply to the display device 240 and the display device 240 may function as a display device, the selector 220 may select the synchronization signal 243 on the first link 221 to be outputted as the control signal 254.

FIG. 3 illustrates another example computing device 300 including two display devices, e.g., a display device 340 and a display device 350, where a control signal 354 to a controller 317 to control a display content 357 received by the display device 350 may be determined based on the availability of a synchronization signal 343 for the display device 340, in accordance with various embodiments. The computing device 300, the display device 340, the display device 350, the control signal 354, the controller 317, the display content 357, and the synchronization signal 343 may be examples of the computing device 100, the display device 140, the display device 150, the display device 160, the control signal 154, the controller 117, the display content 157, and the synchronization signal 143, respectively, as shown in FIG. 1.

In embodiments, the computing device 300 may include the display device 340 and the display device 350, an apparatus 310 that has the controller 317, and a selector 320 to provide the control signal 354 to the controller 317 to control the display content 357 received by the display device 350. A detection circuit 319 may provide a selection signal 318 to a link 325 of the selector 320 to select the control signal 354. The detection circuit 319 may generate the selection signal 318 by detecting the synchronization signal 343 from the display device 340 is available or not. If the synchronization signal 343 from the display device 340 may be available, the selection signal 318 may have a first logic value. Otherwise, the selection signal 318 may have a second logic value different from the first logic value, when the synchronization signal 343 from the display device 340 may not be available. In embodiments, the detection circuit 319 may include a capacitor-resistor constant monostable timer, with a duration longer than a display refresh time determined by a display refresh rate 348 of the display device 340.

In embodiments, the display device 340 may display a display content 347, with a display refresh rate 348, on a display 349. The display content 347 may be received over a channel 341 coupled to the apparatus 310. In addition, the display device 340 may receive a logic power signal 342 from the apparatus 310 to determine a power supply to the display device 340, and may provide the synchronization signal 343 to synchronize the display content 347 received by the display device 340 with the display refresh rate 348. The synchronization signal 343 may be a tearing effect removal timing signal for the display device 340. Furthermore, the display device 340 may provide a synchronization signal 345 to the display device 350 to synchronize the display content 357, when the synchronization signal 343 is available.

In embodiments, the display device 350 may display the display content 357, with a display refresh rate 358, on a display 359. The display content 357 may be received over a channel 351 coupled to the apparatus 310. In addition, the display device 350 may receive a logic power signal 352 from the apparatus 310 to determine a power supply to the display device 350, and may provide a synchronization signal 353 to synchronize the display content 357 received by the display device 350 with the display refresh rate 358. The synchronization signal 353 may be a tearing effect removal timing signal for the display device 350. The display content 357 received by the display device 350 may be synchronized by the synchronization signal 353 from the display device 350 when the synchronization signal 343 may not be available, or synchronized by the display device 340, e.g., by the synchronization signal 345, when the synchronization signal 343 may be available.

In embodiments, the apparatus 310 may include a communication interface 314 to couple to the display device 340, a communication interface 315 to couple to the display device 350, and the controller 317 coupled to the communication interface 314 and the communication interface 315. In more detail, the communication interface 114 may receive a control signal 344, which may be coupled to the synchronization signal 343 from the display device 340. The control signal 344 may be used to synchronize the display content 347 received by the display device 340 with the display refresh rate 348 of the display device 340.

In embodiments, the communication interface 315 may include the channel 351 to couple the display device 350 to transmit the display content 357, the logic power signal 352 to determine a power supply to the display device 350, and to receive the control signal 354, which may be determined by the selector 320.

In embodiments, the selector 320 may be a multiplexer, or any other circuits that may select one output from two inputs. There may be a first link 321, a second link 323, a third link 327, and a fourth link 325 coupled to the selector 320. The first link 321 may couple the selector 320 to receive the synchronization signal 343 from the display device 340. The second link 323 may couple the selector 320 to receive the synchronization signal 353 from the display device 350. The third link 327 may couple the selector 320 to the apparatus 310 to provide the control signal 354 to the controller 317 of the apparatus 310. The fourth link 325 may be coupled to the selector 320 to provide the selector 320 with a selection signal to select one of the signals on the first link 312 and the second link 323, and output as the control signal 354. In embodiments, the selection signal provided on the fourth link 325 may be the selection signal 318 generated by the detection circuit 319.

Figure 4:
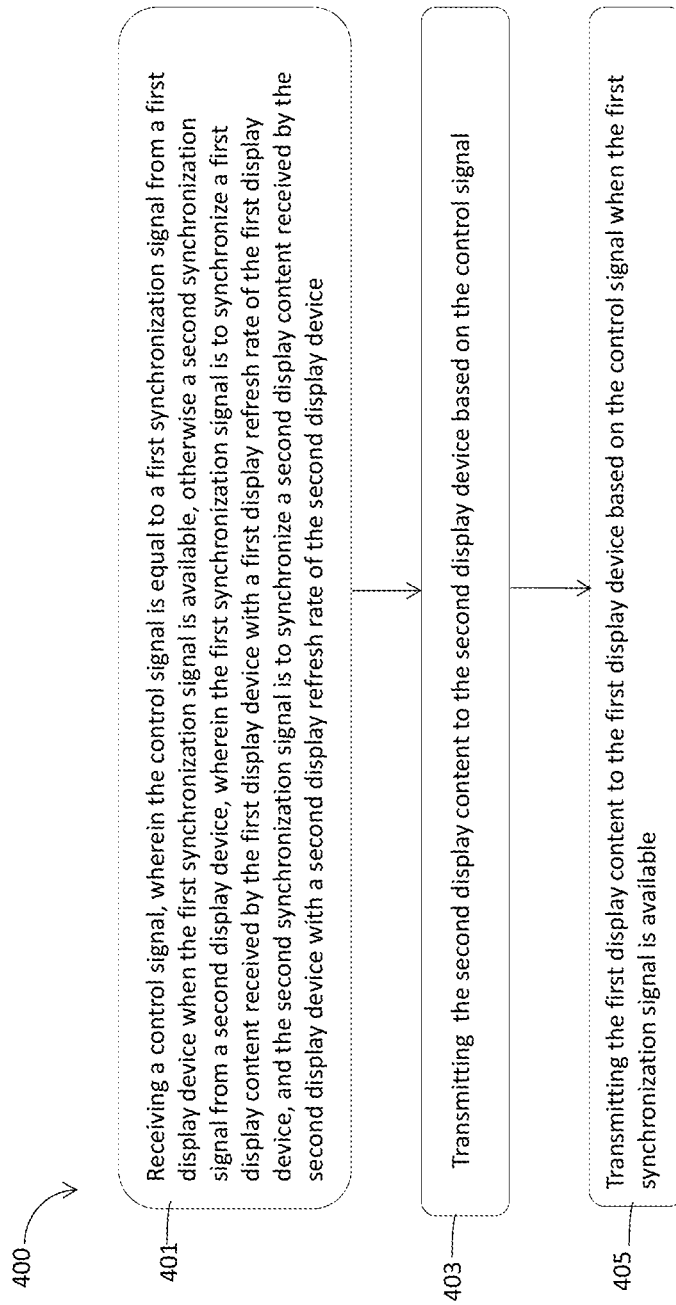
FIG. 4 illustrates an example process for managing a computing device including multiple display devices, where a control signal to a controller to control a display content received by a second display device may be determined based on the availability of a synchronization signal for a first display device, in accordance with various embodiments.

FIG. 4 illustrates an example process 400 for managing a computing device including multiple display devices, where a control signal to a controller to control a display content received by a second display device may be determined based on the availability of a synchronization signal for a first display device, in accordance with various embodiments. In embodiments, the process 400 may be performed by the controller 117, the controller 217, or the controller 317, as shown in FIG. 1, FIG. 2, and FIG. 3.

The process 400 may start at an interaction 401. During the interaction 401, the controller may receive a control signal, where the control signal may be equal to a first synchronization signal from a first display device when the first synchronization signal is available, otherwise a second synchronization signal from a second display device. The first synchronization signal may synchronize a first display content received by the first display device with a first display refresh rate of the first display device, and the second synchronization signal may synchronize a second display content received by the second display device with a second display refresh rate of the second display device. For example, during the interaction 401, the controller 117 may receive the control signal 154. The control signal 154 may be equal to the synchronization signal 143 from the display device 140 when the synchronization signal 143 is available, otherwise the control signal 154 may be equal to the synchronization signal 153 from the display device 150.

During an interaction 403, the controller may transmit the second display content to the second display device based on the control signal. For example, during the interaction 403, the controller 117 may transmit the display content 158 to the display device 150 based on the control signal 154.

During an interaction 405, the controller may transmit the first display content to the first display device based on the control signal when the first synchronization signal is available. For example, during the interaction 405, the controller 117 may transmit the display content 148 to the display device 140 based on the control signal 154, which may be equal to the synchronization signal 143, when the synchronization signal 143 is available.

In some embodiments, the various interactions, e.g., the interaction 401, the interaction 403, or the interaction 405, may be performed in parallel, or in varying orders. Similarly, other interactions may be performed in parallel or in varying orders.

Figure 5:
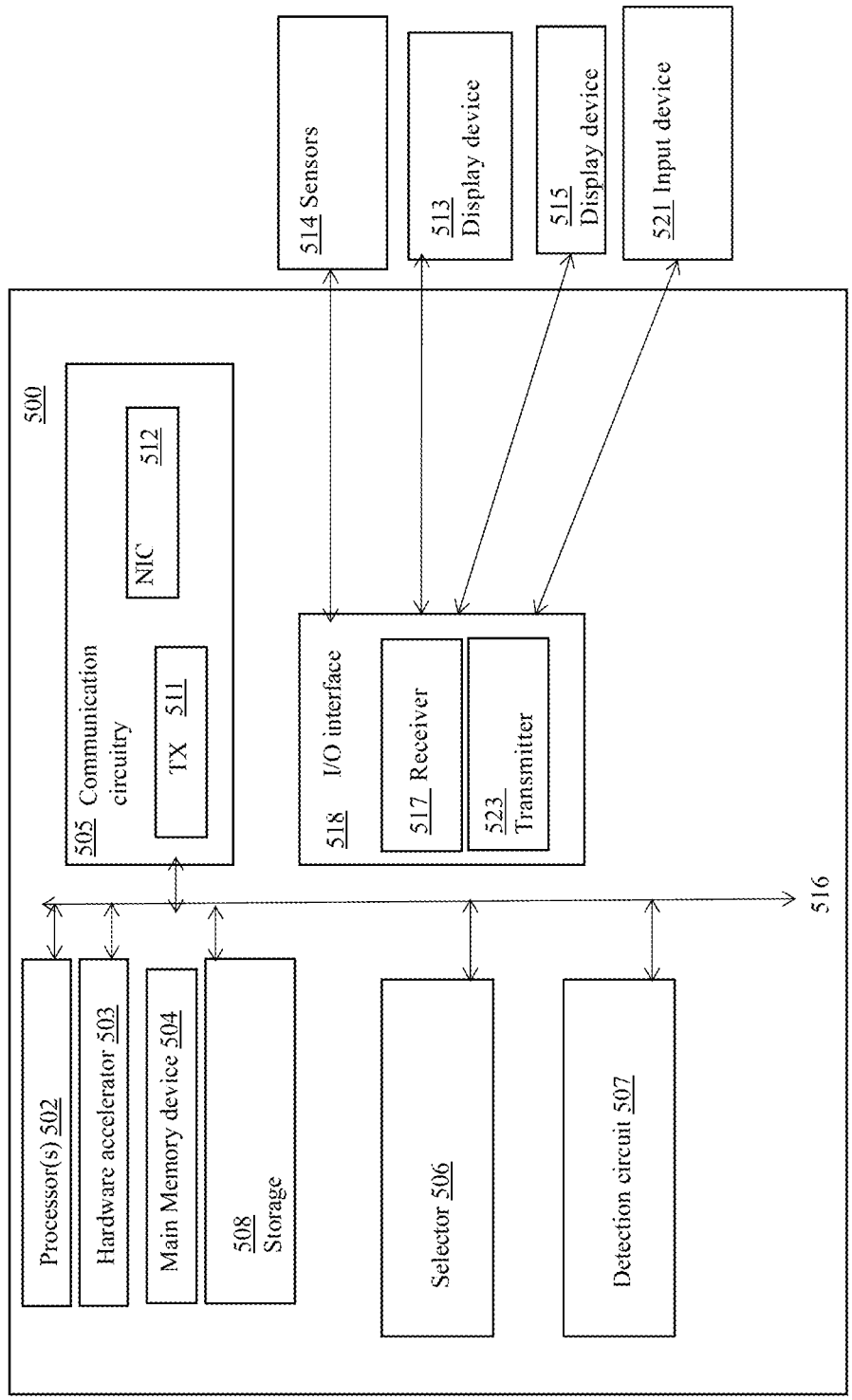
FIG. 5 illustrates an example device suitable for use to practice various aspects of the present disclosure, in accordance with various embodiments.

FIG. 5 illustrates an example device 500 suitable for use to practice various aspects of the present disclosure, in accordance with various embodiments. The device 500 may be used to implement functions of the computing device 100, the computing device 200, the computing device 300, or the process 400. As shown, the device 500 may include one or more processors 502, each having one or more processor cores, or and optionally, a hardware accelerator 503 (which may be an ASIC or a FPGA). In alternate embodiments, the hardware accelerator 503 may be part of processor 502, or integrated together on a SOC. Additionally, the device 500 may include a main memory device 504, which may be any one of a number of known persistent storage medium, and a data storage circuitry 508. In addition, the 500 may include an I/O interface circuitry 518 having a transmitter 523 and a receiver 517, and coupled to one or more sensors 514, a display device 513, a display device 515, and an input device 521. Furthermore, the device 500 may include communication circuitry 505 including a transceiver (Tx) 511, and network interface controller (NIC) 512. The elements may be coupled to each other via system bus 516, which may represent one or more buses. In the case of multiple buses, they may be bridged by one or more bus bridges (not shown).

In addition, the device 500 may include a selector 506 and a detection circuit 507. In embodiments, the selector 506 may be similar to the selector 120, the selector 130, as shown in FIG. 1, the selector 220 as shown in FIG. 2, the selector 320 as shown in FIG. 3, and the detection circuit 507 may be similar to the detection circuit 319 as shown in FIG. 3. Furthermore, the display device 513, or a display device 515, may be similar to the display device 140, the display device 150, the display device 160, as shown in FIG. 1, the display device 240, the display device 250, as shown in FIG. 2, the display device 340, the display device 350, as shown in FIG. 3. The processor(s) 502 may perform functions similarly as the controller 117 as shown in FIG. 1, the controller 217 as shown in FIG. 2, or the controller 317 as shown in FIG. 3.

In embodiments, the processor(s) 502 (also referred to as "processor circuitry 502") may be one or more processing elements configured to perform basic arithmetical, logical, and input/output operations by carrying out instructions. Processor circuitry 502 may be implemented as a standalone system/device/package or as part of an existing system/device/package. The processor circuitry 502 may be one or more microprocessors, one or more single-core processors, one or more multi-core processors, one or more multi-threaded processors, one or more GPUs, one or more ultra-low voltage processors, one or more embedded processors, one or more DSPs, one or more FPDs (hardware accelerators) such as FPGAs, structured ASICs, programmable SoCs (PSoCs), etc., and/or other processor or processing/controlling circuit. The processor circuitry 502 may be a part of a SoC in which the processor circuitry 502 and other components discussed herein are formed into a single IC or a single package. As examples, the processor circuitry 502 may include one or more Intel Pentium®, Core®, Xeon®, Atom®, or Core M® processor(s); Advanced Micro Devices (AMD) Accelerated Processing Units (APUs), Epyc®, or Ryzen® processors; Apple Inc. A series, S series, W series, etc. processor(s); Qualcomm Snapdragon® processor(s); Samsung Exynos® processor(s); and/or the like.

In embodiments, the I/O interface circuitry 518 may include a sensor hub, which may act as a coprocessor by processing data obtained from the one or more sensors 514. The sensor hub may include circuitry configured to integrate data obtained from each of the one or more sensors 514 by performing arithmetical, logical, and input/output operations. In embodiments, the sensor hub may capable of timestamping obtained sensor data, providing sensor data to the processor circuitry 502 in response to a query for such data, buffering sensor data, continuously streaming sensor data to the processor circuitry 502 including independent streams for each sensor of the one or more sensors 514, reporting sensor data based upon predefined thresholds or conditions/triggers, and/or other like data processing functions.

In embodiments, the memory 504 (also referred to as "memory circuitry 504" or the like) may be circuitry configured to store data or logic for operating the computer device 500. The memory circuitry 504 may include number of memory devices may be used to provide for a given amount of system memory. As examples, the memory circuitry 504 can be any suitable type, number and/or combination of volatile memory devices (e.g., random access memory (RAM), dynamic RAM (DRAM), static RAM (SAM), etc.) and/or non-volatile memory devices (e.g., read-only memory (ROM), erasable programmable read-only memory (EPROM), electrically erasable programmable read-only memory (EEPROM), flash memory, antifuses, etc.) that may be configured in any suitable implementation as are known. In various implementations, individual memory devices may be formed of any number of different package types, such as single die package (SDP), dual die package (DDP) or quad die package (Q17P), dual inline memory modules (DIMMs) such as microDIMMs or MiniDIMMs, and/or any other like memory devices. To provide for persistent storage of information such as data, applications, operating systems and so forth, the memory circuitry 504 may include one or more mass-storage devices, such as a solid state disk drive (SSDD); flash memory cards, such as SD cards, microSD cards, xD picture cards, and the like, and USB flash drives; on-die memory or registers associated with the processor circuitry 502 (for example, in low power implementations); a micro hard disk drive (HDD); three dimensional cross-point (3D XPOINT) memories from Intel® and Micron®, etc.

Where FPDs are used, the processor circuitry 502 and memory circuitry 504 (and/or data storage circuitry 508) may comprise logic blocks or logic fabric, memory cells, input/output (I/O) blocks, and other interconnected resources that may be programmed to perform various functions of the example embodiments discussed herein. The memory cells may be used to store data in lookup-tables (LUTs) that are used by the processor circuitry 502 to implement various logic functions. The memory cells may include any combination of various levels of memory/ storage including, but not limited to, EPROM, EEPROM, flash memory, SRAM, antifuses, etc.

In embodiments, the data storage circuitry 508 (also referred to as "storage circuitry 508" or the like), with shared or respective controllers, may provide for persistent storage of information, operating systems, etc. The data storage circuitry 508 may be implemented as solid state drives (SSDs); solid state disk drive (SSDD); serial AT attachment (SATA) storage devices (e.g., SATA SSDs); flash drives; flash memory cards, such as SD cards, microSD cards, xD picture cards, and the like, and USB flash drives; three-dimensional cross-point (3D Xpoint) memory devices; on-die memory or registers associated with the processor circuitry 502; hard disk drives (HDDs); micro HDDs; resistance change memories; phase change memories; holographic memories; or chemical memories; among others. As shown, the data storage circuitry 508 is included in the computer device 500; however, in other embodiments, the data storage circuitry 508 may be implemented as one or more devices separated from the other elements of computer device 500.

In some embodiments, the data storage circuitry 508 may include an operating system (OS) (not shown), which may be a general purpose operating system or an operating system specifically written for and tailored to the computer device 500. The OS may include one or more drivers, libraries, and/or application programming interfaces (APIs), which provide program code and/or software components, and/or control system configurations to control and/or obtain/process data from the one or more sensors 514.

The components of computer device 500 may communicate with one another over the bus 516. The bus 516 may include any number of technologies, such as a Local Interconnect Network (LIN); industry standard architecture (ISA); extended ISA (EISA); PCI; PCI extended (PCIx); PCIe; an Inter-Integrated Circuit (I2C) bus; a Parallel Small Computer System Interface (SPI) bus; Common Application Programming Interface (CAPI); point to point interfaces; a power bus; a proprietary bus, for example, Intel® Ultra Path Interface (UPI), Intel® Accelerator Link (IAL), or some other proprietary bus used in a SoC based interface; or any number of other technologies. In some embodiments, the bus 516 may be a controller area network (CAN) bus system, a Time-Trigger Protocol (TTP) system, or a FlexRay system, which may allow various devices (e.g., the one or more sensors 514, etc.) to communicate with one another using messages or frames.

The communications circuitry 505 may include circuitry for communicating with a wireless network or wired network. For example, the communication circuitry 505 may include transceiver (Tx) 511 and network interface controller (NIC) 512. Communications circuitry 505 may include one or more processors (e.g., baseband processors, modems, etc.) that are dedicated to a particular wireless communication protocol.

NIC 512 may be included to provide a wired communication link to a network and/or other devices. The wired communication may provide an Ethernet connection, an Ethernet-over-USB, and/or the like, or may be based on other types of networks, such as DeviceNet, ControlNet, Data Highway+, PROFIBUS, or PROFINET, among many others. An additional NIC 512 may be included to allow connect to a second network (not shown) or other devices, for example, a first NIC 512 providing communications to the network 150 over Ethernet, and a second NIC 512 providing communications to other devices over another type of network, such as a personal area network (PAN) including a personal computer (PC) device. In some embodiments, the various components of the device 500, such as the one or more sensors 514, etc. may be connected to the processor(s) 502 via the NIC 512 as discussed above rather than via the I/O interface circuitry 518 as discussed infra.

The Tx 511 may include one or more radios to wirelessly communicate with a network and/or other devices. The Tx 511 may include hardware devices that enable communication with wired networks and/or other devices using modulated electromagnetic radiation through a solid or non-solid medium. Such hardware devices may include switches, filters, amplifiers, antenna elements, and the like to facilitate the communications over the air (OTA) by generating or otherwise producing radio waves to transmit data to one or more other devices, and converting received signals into usable information, such as digital data, which may be provided to one or more other components of computer device 500. In some embodiments, the various components of the device 500, such as the one or more sensors 514, etc. may be connected to the device 500 via the Tx 511 as discussed above rather than via the I/O interface circuitry 518 as discussed infra. In one example, the one or more sensors 514 may be coupled with device 500 via a short range communication protocol.

The Tx511 may include one or multiple radios that are compatible with any number of 3GPP (Third Generation Partnership Project) specifications, notably Long Term Evolution (LTE), Long Term Evolution-Advanced (LTE-A), Long Term Evolution-Advanced Pro (LTE-A Pro), and Fifth Generation (5G) New Radio (NR). It can be noted that radios compatible with any number of other fixed, mobile, or satellite communication technologies and standards may be selected. These may include, for example, any Cellular Wide Area radio communication technology, which may include e.g. a 5G communication systems, a Global System for Mobile Communications (GSM) radio communication technology, a General Packet Radio Service (GPRS) radio communication technology, or an Enhanced Data Rates for GSM Evolution (EDGE) radio communication technology. Other Third Generation Partnership Project (3GPP) radio communication technology that may be used includes UMTS (Universal Mobile Telecommunications System), FOMA (Freedom of Multimedia Access), 3GPP LTE (Long Term Evolution), 3GPP LTE Advanced (Long Term Evolution Advanced), 3GPP LTE Advanced Pro (Long Term Evolution Advanced Pro)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+(High Speed Packet Access Plus), UMTS-TDD (Universal Mobile Telecommunications System-Time-Division Duplex), TD-CDMA (Time Division-Code Division Multiple Access), TD-SCDMA (Time Division-Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP LTE Extra, LTE Licensed-Assisted Access (LAA), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, Unlicensed Mobile Access (UMA, also referred to as also referred to as 3GPP Generic Access Network, or GAN standard)), Wireless Gigabit Alliance (WiGig) standard, mmWave standards in general (wireless systems operating at 10-90 GHz and above such as WiGig, IEEE 802.11ad, IEEE 802.11ay, and the like. In addition to the standards listed above, any number of satellite uplink technologies may be used for the uplink transceiver, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated. Implementations, components, and details of the aforementioned protocols may be those known in the art and are omitted herein for the sake of brevity.

The input/output (I/O) interface circuitry 518 may include circuitry, such as an external expansion bus (e.g., Universal Serial Bus (USB), FireWire, Thunderbolt, PCI/PCIe/PCIx, etc.), used to connect computer device 500 with external components/devices, such as one or more sensors 514, etc. I/O interface circuitry 518 may include any suitable interface controllers and connectors to interconnect one or more of the processor circuitry 502, memory circuitry 504, data storage circuitry 508, communication circuitry 505, and the other components of computer device 500. The interface controllers may include, but are not limited to, memory controllers, storage controllers (e.g., redundant array of independent disk (RAID) controllers, baseboard management controllers (BMCs), input/output controllers, host controllers, etc. The connectors may include, for example, busses (e.g., bus 516), ports, slots, jumpers, interconnect modules, receptacles, modular connectors, etc. The I/O interface circuitry 518 may couple the device 500 with the one or more sensors 514, etc. via a wired connection, such as using USB, FireWire, Thunderbolt, RCA, a video graphics array (VGA), a digital visual interface (DVI) and/or mini-DVI, a high-definition multimedia interface (HDMI), an S-Video, and/or the like.

The one or more sensors 514 may be any device configured to detect events or environmental changes, convert the detected events into electrical signals and/or digital data, and transmit/send the signals/data to the computer device 500. Some of the one or more sensors 514 may be sensors used for providing computer-generated sensory inputs. Some of the one or more sensors 514 may be sensors used for motion and/or object detection. Examples of such one or more sensors 514 may include, inter alia, charged-coupled devices (CCD), Complementary metal-oxide-semiconductor (CMOS) active pixel sensors (APS), lens-less image capture devices/cameras, thermographic (infrared) cameras, Light Imaging Detection And Ranging (LIDAR) systems, and/or the like. In some implementations, the one or more sensors 514 may include a lens-less image capture mechanism comprising an array of aperture elements, wherein light passing through the array of aperture elements define the pixels of an image. In embodiments, the motion detection one or more sensors 514 may be coupled with or associated with light generating devices, for example, one or more infrared projectors to project a grid of infrared light onto a scene, where an infrared camera may record reflected infrared light to compute depth information.

Some of the one or more sensors 514 may be used for position and/or orientation detection, ambient/environmental condition detection, and the like. Examples of such one or more sensors 514 may include, inter alia, microelectromechanical systems (MEMS) with piezoelectric, piezoresistive and/or capacitive components, which may be used to determine environmental conditions or location information related to the computer device 500. In embodiments, the MEMS may include 3-axis accelerometers, 3-axis gyroscopes, and/or magnetometers. In some embodiments, the one or more sensors 514 may also include one or more gravimeters, altimeters, barometers, proximity sensors (e.g., infrared radiation detector(s) and the like), depth sensors, ambient light sensors, thermal sensors (thermometers), ultrasonic transceivers, and/or the like.

Each of these elements, e.g., one or more processors 502, the hardware accelerator 503, the memory 504, the data storage circuitry 508, the input/output interface circuitry 518, the one or more sensors 514, the communication circuitry 505 including the Tx 511, and the NIC 512, and the system bus 516 may perform its conventional functions known in the art. In addition, they may be employed to store and host execution of programming instructions (e.g., via storage 508, main memory device 504 and processor(s) 502) implementing the operations associated with an operating system, and one or more applications, e.g., a neural network of an artificial intelligence applications. The operation system and/or applications may be implemented by assembler instructions supported by processor(s) 502 or high-level languages, such as, for example, C, that can be compiled into such instructions. Operations associated with the device 500 not implemented in software may be implemented in hardware, e.g., via hardware accelerator 503.

The number, capability and/or capacity of these elements 502-523 may vary, depending on the number of other devices the device 500 is configured to support. Otherwise, the constitutions of elements 502-523 are known, and accordingly will not be further described.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module," or "system."

Figure 6:
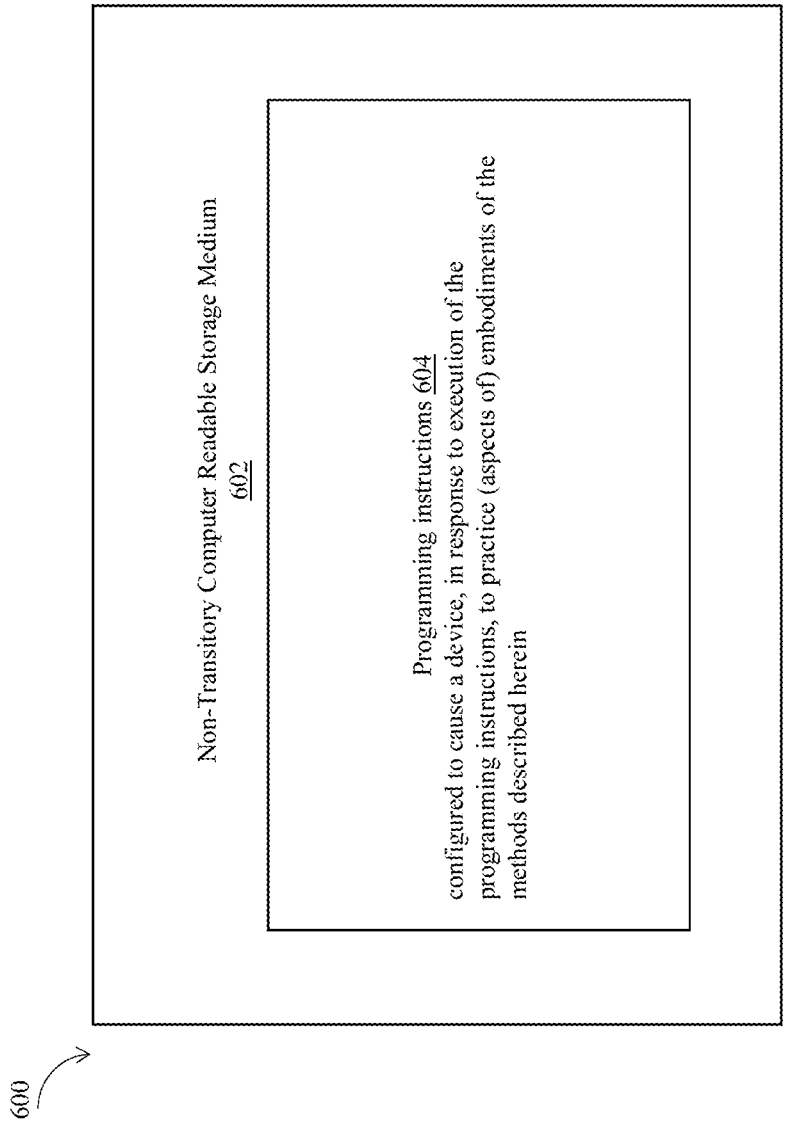
FIG. 6 illustrates a storage medium having instructions for practicing methods described with references to FIGS. 1-5, in accordance with various embodiments.

Furthermore, the present disclosure may take the form of a computer program product embodied in any tangible or non-transitory medium of expression having computer-usable program code embodied in the medium. FIG. 6 illustrates an example computer-readable non-transitory storage medium that may be suitable for use to store instructions that cause an apparatus or a computing device, in response to execution of the instructions by the apparatus or the computing device, to practice selected aspects of the present disclosure. As shown, non-transitory computer-readable storage medium 602 may include a number of programming instructions 604. Programming instructions 604 may be configured to enable a device, e.g., device 500, in particular, processor(s) 502, in response to execution of the programming instructions, to perform, e.g., various operations associated with an apparatus for providing a control signal to a controller to control a display content received by a second display device, where the control signal may be determined based on the availability of a synchronization signal for a first display device, as shown in FIGS. 1-5.

In alternate embodiments, programming instructions 604 may be disposed on multiple computer-readable non-transitory storage media 602 instead. In alternate embodiments, programming instructions 604 may be disposed on computer-readable transitory storage media 602, such as, signals. Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment are chosen and described in order to best explain the principles of the disclosure and the practical application, and to enable others of ordinary skill in the art to understand the disclosure for embodiments with various modifications as are suited to the particular use contemplated.

Thus various example embodiments of the present disclosure have been described including, but are not limited to:

Example 1 may include an apparatus for computing, comprising: a selector; a first link coupled to the selector to receive a first synchronization signal from a first display device of the apparatus or a computing device hosting the apparatus, wherein the first synchronization signal is to synchronize a first display content received by the first display device with a first display refresh rate of the first display device; a second link coupled to the selector to receive a second synchronization signal from a second display device of the apparatus or the computing device, wherein the second synchronization signal is to synchronize a second display content received by the second display device with a second display refresh rate of the second display device; a third link coupled to the selector to provide a control signal to a controller of the apparatus or the computing device to control the second display content received by the second display device; and a fourth link coupled to the selector to provide the selector with a selection signal to select the first synchronization signal as the control signal to be provided to the controller when the first synchronization signal is available, otherwise to select the second synchronization signal as the control signal to be provided to the controller.

Example 2 may include the apparatus of example 1 and/or some other examples herein, wherein the first display device is a master display device of the apparatus or the computing device, and the second display device is a slave display device of the apparatus or the computing device.

Example 3 may include the apparatus of example 1 and/or some other examples herein, wherein the second display content received by the second display device is synchronized by the second synchronization signal from the second display device when the first synchronization signal is not available, or synchronized by the first display device when the first synchronization signal is available.

Example 4 may include the apparatus of example 1 and/or some other examples herein, wherein the first synchronization signal from the first display device is a tearing effect removal timing signal for the first display device, or the second synchronization signal from the second display device is a tearing effect removal timing signal for the second display device.

Example 5 may include the apparatus of example 1 and/or some other examples herein, wherein the first display refresh rate of the first display device or the second display refresh rate of the second display device is in a frame by frame basis.

Example 6 may include the apparatus of example 1 and/or some other examples herein, wherein the first display refresh rate of the first display device or the second display refresh rate of the second display device is 60 Hz, 120 hz, or 240 hz.

Example 7 may include the apparatus of example 1 and/or some other examples herein, wherein the first display device or the second display device includes a display, and wherein the display is a selected one of a light-emitting diode (LED) display, a cathode ray tubes (CRT) display, a liquid crystal display (LCD), a thin film transistor liquid crystal display (TFT-LCD), a digital light processing (DLP) display, a plasma display, an electroluminescent panel, an organic light-emitting diode (OLED) display, or an electronic paper.

Example 8 may include the apparatus of example 1 and/or some other examples herein, wherein the first display content received by the first display device or the second display content received by the second display device is received according to a protocol selected from a mobile industry processor interface display serial interface (MIPI-DSI) protocol, a high-definition multimedia interface (HDMI) protocol, a display port (DP) protocol, a Miracast protocol, or a wireless display (WiDi) protocol.

Example 9 may include the apparatus of example 1 and/or some other examples herein, wherein the first display device functions as a display device or as an input device to the apparatus or the computing device.

Example 10 may include the apparatus of example 1 and/or some other examples herein, wherein the apparatus comprises the first display device; and the second display device, wherein the apparatus is a tablet, a mobile device, a smart phone, a smart television (TV), a touchscreen display, or a head-mounted display (HMD).

Example 11 may include the apparatus of example 1 and/or some other examples herein, wherein the computing device, in addition to the apparatus, comprises: the first display device; and the second display device, wherein the computing device is a tablet, a mobile device, a smart phone, a smart television (TV), a touchscreen display, or a head-mounted display (HMD).

Example 12 may include the apparatus of example 1 and/or some other examples herein, wherein the selector is a multiplexer, and the selection signal is a logic power signal to the first display device to determine a power supply to the first display device.

Example 13 may include the apparatus of example 1 and/or some other examples herein, further comprising: a detection circuit to generate the selection signal by detecting the first synchronization signal from the first display device is available or not.

Example 14 may include the apparatus of example 13 and/or some other examples herein, wherein the detection circuit includes a capacitor-resistor constant mono-stable timer, with a duration longer than a display refresh time determined by the display refresh rate of the first display device.

Example 15 may include an apparatus for computing, comprising: a communication interface to receive a control signal, wherein the control signal is a first synchronization signal from a first display device of the apparatus or a computing device hosting the apparatus when the first synchronization signal is available, otherwise a second synchronization signal from a second display device of the apparatus or the computing device, wherein the first synchronization signal is to synchronize a first display content received by the first display device with a first display refresh rate of the first display device, and the second synchronization signal is to synchronize a second display content received by the second display device with a second display refresh rate of the second display device; and a controller coupled to the communication interface to determine to transmit the second display content to the second display device based on the control signal.

Example 16 may include the apparatus of example 15 and/or some other examples herein, wherein the controller is further to determine to transmit the first display content to the first display device based on the control signal when the first synchronization signal is available.

Example 17 may include the apparatus of example 15 and/or some other examples herein, wherein the first display device is a master display device, and the second display device is a slave display device.

Example 18 may include the apparatus of example 15 and/or some other examples herein, wherein the first synchronization signal from the first display device is a tearing effect removal timing signal for the first display device, or the second synchronization signal from the second display device is a tearing effect removal timing signal for the second display device.

Example 19 may include the apparatus of example 15 and/or some other examples herein, wherein the first display device or the second display device includes a display, and wherein the display is a selected one of a light-emitting diode (LED) display, a cathode ray tubes (CRT) display, a liquid crystal display (LCD), a thin film transistor liquid crystal display (TFT-LCD), a digital light processing (DLP) display, a plasma display, an electroluminescent panel, an organic light-emitting diode (OLED) display, or an electronic paper.

Example 20 may include the apparatus of example 15 and/or some other examples herein, wherein the first display content received by the first display device or the second display content received by the second display device is received according to a protocol selected from a mobile industry processor interface display serial interface (MIPI-DSI) protocol, a high-definition multimedia interface (HDMI) protocol, a display port (DP) protocol, a Miracast protocol, or a wireless display (WiDi) protocol.

Example 21 may include a method for communication of display content, comprising: receiving a control signal, wherein the control signal is equal to a first synchronization signal from a first display device when the first synchronization signal is available, otherwise a second synchronization signal from a second display device, wherein the first synchronization signal is to synchronize a first display content received by the first display device with a first display refresh rate of the first display device, and the second synchronization signal is to synchronize a second display content received by the second display device with a second display refresh rate of the second display device; and transmitting the second display content to the second display device based on the control signal.

Example 22 may include the method of example 21 and/or some other examples herein, further comprising: transmitting the first display content to the first display device based on the control signal when the first synchronization signal is available.

Example 23 may include the method of example 21 and/or some other examples herein, wherein the first display device is a master display device, and the second display device is a slave display device.

Example 24 may include the method of example 21 and/or some other examples herein, wherein the first synchronization signal from the first display device is a tearing effect removal timing signal for the first display device, or the second synchronization signal from the second display device is a tearing effect removal timing signal for the second display device.

Example 25 may include the method of example 21 and/or some other examples herein, wherein the first display content received by the first display device or the second display content received by the second display device is received according to a protocol selected from a mobile industry processor interface display serial interface (MIPI-DSI) protocol, a high-definition multimedia interface (HDMI) protocol, a display port (DP) protocol, a Miracast protocol, or a wireless display (WiDi) protocol.

Although certain embodiments have been illustrated and described herein for purposes of description this application is intended to cover any adaptations or variations of the embodiments discussed herein. Therefore, it is manifestly intended that embodiments described herein be limited only by the claims.

What is claimed is:
1. An apparatus for computing, comprising:
a selector;
a first link coupled to the selector to receive a first synchronization signal from a first display device through the first link between the selector and the first display device, wherein the first synchronization signal is to synchronize a first display content received by the first display device with a first display refresh rate of the first display device, and wherein there is a connection between the first display device and a controller to supply the first synchronization signal to the controller to synchronize the first display content, the first link and the connection providing two different signal paths disjoint from each other;
a second link coupled to the selector to receive a second synchronization signal from a second display device, wherein the second synchronization signal is to synchronize a second display content received by the second display device with a second display refresh rate of the second display device;
a third link coupled to the selector to provide a control signal to the controller to control the second display content received by the second display device; and
a fourth link coupled to the selector to provide the selector with a selection signal to select the first synchronization signal as the control signal to be provided to the controller when the first display device is configured to function as a display device and the first synchronization signal is available, otherwise to select the second synchronization signal as the control signal to be provided to the controller when the first display device is not configured to function as a display device.

2. The apparatus of claim 1, wherein the first display device is a master display device, and the second display device is a slave display device.

3. The apparatus of claim 1, wherein the second display content received by the second display device is synchronized by the second synchronization signal from the second display device when the first synchronization signal is not available, or synchronized by the first display device when the first synchronization signal is available.

4. The apparatus of claim 1, wherein the first synchronization signal from the first display device is a tearing effect removal timing signal for the first display device, or the second synchronization signal from the second display device is a tearing effect removal timing signal for the second display device.

5. The apparatus of claim 1, wherein the first display refresh rate of the first display device or the second display refresh rate of the second display device is in a frame by frame basis.

6. The apparatus of claim 1, wherein the first display refresh rate of the first display device or the second display refresh rate of the second display device is 60 Hz, 120 hz, or 240 hz.

7. The apparatus of claim 1, wherein the first display device or the second display device includes a display, and wherein the display is a selected one of a light-emitting diode (LED) display, a cathode ray tubes (CRT) display, a liquid crystal display (LCD), a thin film transistor liquid crystal display (TFT-LCD), a digital light processing (DLP) display, a plasma display, an electroluminescent panel, an organic light-emitting diode (OLED) display, or an electronic paper.

8. The apparatus of claim 1, wherein the first display content received by the first display device or the second display content received by the second display device is received according to a protocol selected from a mobile industry processor interface display serial interface (MIPI-DSI) protocol, a high-definition multimedia interface (HDMI) protocol, a display port (DP) protocol, a Miracast protocol, or a wireless display (WiDi) protocol.

9. The apparatus of claim 1, wherein the first display device functions as a display device or as an input device.

10. The apparatus of claim 1, wherein the apparatus further comprises:
the first display device; and
the second display device, wherein the apparatus is a tablet, a mobile device, a smart phone, a smart television (TV), a touchscreen display, or a head-mounted display (HMD).

11. The apparatus of claim 1, wherein the apparatus is hosted within a computing device, wherein the computing device is a tablet, a mobile device, a smart phone, a smart television (TV), a touchscreen display, or a head-mounted display (HMD).

12. The apparatus of claim 1, wherein the selector is a multiplexer, and the selection signal is a logic power signal to the first display device to determine a power supply to the first display device.

13. The apparatus of claim 1, further comprising: a detection circuit to generate the selection signal by detecting the first synchronization signal from the first display device is available or not.

14. The apparatus of claim 13, wherein the detection circuit includes a capacitor-resistor constant mono-stable timer, with a duration longer than a display refresh time determined by the display refresh rate of the first display device.

15. An apparatus for computing, comprising: a communication interface to receive a control signal, wherein the control signal is selected by a selector to be a first synchronization signal from a first display device when the first display device is configured to function as a display device and the first synchronization signal is available, otherwise is selected by the selector to be a second synchronization signal from a second display device when the first display device is not configured to function as a display device, wherein the first synchronization signal is to synchronize a first display content received by the first display device with a first display refresh rate of the first display device, and the second synchronization signal is to synchronize a second display content received by the second display device with a second display refresh rate of the second display device; and a controller coupled to the communication interface to determine to transmit the second display content to the second display device based on the control signal, wherein the first synchronization signal is supplied to the selector by a first link between the first display device and the selector, and also supplied to the controller by a connection between the first display device and the controller to supply the first synchronization signal to the controller to synchronize the first display content, the first link and the connection providing two different signal paths disjoint from each other.

16. The apparatus of claim 15, wherein the controller is further to determine to transmit the first display content to the first display device based on the control signal when the first synchronization signal is available.

17. The apparatus of claim 15, wherein the first display device is a master display device, and the second display device is a slave display device.

18. The apparatus of claim 15, wherein the first synchronization signal from the first display device is a tearing effect removal timing signal for the first display device, or the second synchronization signal from the second display device is a tearing effect removal timing signal for the second display device.

19. The apparatus of claim 15, wherein the first display device or the second display device includes a display, and wherein the display is a selected one of a light-emitting diode (LED) display, a cathode ray tubes (CRT) display, a liquid crystal display (LCD), a thin film transistor liquid crystal display (TFT-LCD), a digital light processing (DLP) display, a plasma display, an electroluminescent panel, an organic light-emitting diode (OLED) display, or an electronic paper.

20. The apparatus of claim 15, wherein the first display content received by the first display device or the second display content received by the second display device is received according to a protocol selected from a mobile industry processor interface display serial interface (MIPI-DSI) protocol, a high-definition multimedia interface (HDMI) protocol, a display port (DP) protocol, a Miracast protocol, or a wireless display (WiDi) protocol.

21. A method for communication of display content, comprising:
receiving a control signal, wherein the control signal is selected by a selector to be a first synchronization signal from a first display device when the first display device is configured to function as a display device and the first synchronization signal is available, otherwise is selected by the selector to be a second synchronization signal from a second display device when the first display device is not configured to function as a display device, wherein the first synchronization signal is to synchronize a first display content received by the first display device with a first display refresh rate of the first display device, and the second synchronization signal is to synchronize a second display content received by the second display device with a second display refresh rate of the second display device; and transmitting, controlled by a controller, the second display content to the second display device based on the control signal, wherein the first synchronization signal is supplied to the selector by a first link between the first display device and the selector, and also supplied to the controller by a connection between the first display device and the controller to supply the first synchronization signal to the controller to synchronize the first display content, the first link and the connection providing two different signal paths disjoint from each other.

22. The method of claim 21, further comprising:
transmitting the first display content to the first display device based on the control signal when the first synchronization signal is available.

23. The method of claim 21, wherein the first display device is a master display device, and the second display device is a slave display device.

24. The method of claim 21, wherein the first synchronization signal from the first display device is a tearing effect removal timing signal for the first display device, or the second synchronization signal from the second display device is a tearing effect removal timing signal for the second display device.

25. The method of claim 21, wherein the first display content received by the first display device or the second display content received by the second display device is received according to a protocol selected from a mobile industry processor interface display serial interface (MIPI-DSI) protocol, a high-definition multimedia interface (HDMI) protocol, a display port (DP) protocol, a Miracast protocol, or a wireless display (WiDi) protocol.

* * * * *